(12) United States Patent
Beers et al.

(10) Patent No.: US 10,196,149 B2
(45) Date of Patent: *Feb. 5, 2019

(54) SECOND STAGE TURBINE NOZZLE WITH EROSION COATING SURFACE FINISH

(71) Applicant: Hamilton Sundstrand Corporation, Windsor Locks, CT (US)

(72) Inventors: Craig M. Beers, Wethersfield, CT (US); Kevin M. Rankin, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 999 days.

This patent is subject to a terminal disclaimer.

(21) Appl. No.: 14/584,486

(22) Filed: Dec. 29, 2014

(65) Prior Publication Data

US 2016/0186585 A1    Jun. 30, 2016

(51) Int. Cl.
*B64D 13/06* (2006.01)
*F01D 9/04* (2006.01)
(Continued)

(52) U.S. Cl.
CPC ............. *B64D 13/06* (2013.01); *F01D 9/045* (2013.01); *B64D 2013/0662* (2013.01);
(Continued)

(58) Field of Classification Search
CPC ........ F01D 9/045; F04D 25/04; F04D 29/321; F04D 29/325; F05D 2250/62;
(Continued)

(56) References Cited

U.S. PATENT DOCUMENTS 5,249,934 A * 10/1993 Merritt ................ F04D 29/5853
417/406
5,309,735 A    5/1994 Maher, Jr. et al.
(Continued)

FOREIGN PATENT DOCUMENTS

CN    1118429 A    3/1996
CN    102286744 A    12/2011
(Continued)

OTHER PUBLICATIONS

First Chinese Office Action for Chinese Patent Application No. 201510696160.9, dated Feb. 24, 2018, 15 pages.

*Primary Examiner* — Dwayne J White
*Assistant Examiner* — Adam W Brown
(74) *Attorney, Agent, or Firm* — Kinney & Lange, P.A.

(57) ABSTRACT

A second stage turbine nozzle includes a second stage disk portion having a central axis, and a plurality of second stage vanes positioned radially around and attached to the second stage disk portion. Each second stage vane extends a vane height H away from the second stage disk portion and each second stage vane has a first end positioned at a diameter D away from the central axis. The second stage turbine nozzle also includes a plurality of second stage throats defined between radially adjacent second stage vanes. Each second stage throat has a throat width W between radially adjacent second stage vanes. The second stage turbine nozzle also includes a coating on a sidewall of each second stage vane, wherein a surface roughness of the sidewall is between 125 microinches Ra and 200 microinches Ra.

2 Claims, 4 Drawing Sheets

(51) Int. Cl.
*F04D 29/32* (2006.01)
*F04D 25/04* (2006.01)

(52) U.S. Cl.
CPC ............ *F04D 25/04* (2013.01); *F04D 29/321* (2013.01); *F04D 29/325* (2013.01); *F05D 2230/90* (2013.01); *F05D 2250/62* (2013.01); *F05D 2300/2263* (2013.01)

(58) Field of Classification Search
CPC ......... F05D 2300/2263; F05D 2230/90; B64D 13/08; B64D 13/02; B64D 2013/0648; B22D 25/02; C23C 4/129; C23C 4/06
See application file for complete search history.

(56) References Cited

U.S. PATENT DOCUMENTS

| | | | |
|---|---|---|---|
| 5,460,003 A * | 10/1995 | Nenov | F01D 9/045 415/186 |
| 6,059,533 A * | 5/2000 | Stoker | C23C 4/02 415/119 |
| 6,257,003 B1 | 7/2001 | Hipsky | |
| 6,368,727 B1 * | 4/2002 | Ritter | C23C 4/02 427/456 |
| 6,789,315 B2 * | 9/2004 | Marques | B23P 6/002 228/119 |
| 6,860,718 B2 * | 3/2005 | Suzuki | F01D 5/225 415/173.5 |
| 7,163,369 B2 * | 1/2007 | Bruce | F01D 17/162 415/160 |
| 8,113,787 B2 * | 2/2012 | Barril | F01D 5/288 416/224 |
| 8,118,561 B2 | 2/2012 | Bruce et al. | |
| 8,192,850 B2 * | 6/2012 | Brinley | C23C 4/06 428/615 |
| 2011/0312860 A1 * | 12/2011 | Mathew | C23C 4/04 508/103 |
| 2012/0156028 A1 * | 6/2012 | Colson | F01D 25/28 415/208.2 |
| 2014/0321979 A1 | 10/2014 | Beers et al. | |
| 2014/0322000 A1 * | 10/2014 | Beers | F01D 17/165 415/191 |

FOREIGN PATENT DOCUMENTS

| | | |
|---|---|---|
| CN | 102562178 A | 7/2012 |
| CN | 202348347 U | 7/2012 |

* cited by examiner

SECOND STAGE TURBINE NOZZLE WITH EROSION COATING SURFACE FINISH

BACKGROUND

The present disclosure relates to aircraft environmental control systems. More specifically, the present disclosure relates to a second stage turbine nozzle for an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

Air cycle machines typically utilize turbine nozzles that can rotate to direct air in a radial direction with respect to a main axis of the air cycle machine. Turbine nozzles are typically coated with an erosion coating to protect the turbine nozzles from damage. Erosion can be caused by particles in the air flowing through the air cycle machine. Applying a coating to the turbine nozzle will cause the coating to erode but will protect the turbine nozzle from erosion. The coating can be reapplied as needed to fill areas that have eroded to extend the life of the turbine nozzle in the air cycle machine.

Turbine nozzles are typically cast, so prior to applying a coating, turbine nozzles have to be post-processed to smooth the turbine nozzle. Post-processing can include machining or sand blasting. The coating can be applied using a number of different thermal spraying techniques, including detonation gun spraying and high velocity oxygen fuel (HVOF) spraying. Detonation gun spraying applies a coating using a detonation gun with a long water-cooled barrel. Oxygen, fuel, and powder are fed into the barrel of the detonation gun and a spark is used to ignite the oxygen and fuel mixture. This will heat the powder and accelerate the powder through and out of the barrel to be applied to a substrate. HVOF spraying applies a coating using a combustion chamber. A mixture of fuel and oxygen is fed into the combustion chamber where it is ignited and combusted continuously. The hot gas from the combustion will travel through a nozzle and a powder feed stock is fed into the gas stream in the nozzle. The powder feed stock will partially melt and will flow out of the nozzle to be deposited on a substrate.

SUMMARY

A second stage turbine nozzle includes a second stage disk portion having a central axis, and a plurality of second stage vanes positioned radially around and attached to the second stage disk portion. Each second stage vane extends a vane height H away from the second stage disk portion and each second stage vane has a first end positioned at a diameter D away from the central axis. The second stage turbine nozzle also includes a plurality of second stage throats defined between radially adjacent second stage vanes. Each second stage throat has a throat width W between radially adjacent second stage vanes. The second stage turbine nozzle also includes a coating on a sidewall of each second stage vane, wherein a surface roughness of the sidewall is between 125 Ra and 200.

A method of coating a second stage turbine nozzle includes casting a second stage turbine nozzle with a second stage disk portion and a plurality of second stage vanes, and applying an erosion coating to a cast sidewall of each of the plurality of second stage vanes.

DETAILED DESCRIPTION

Figure 1:
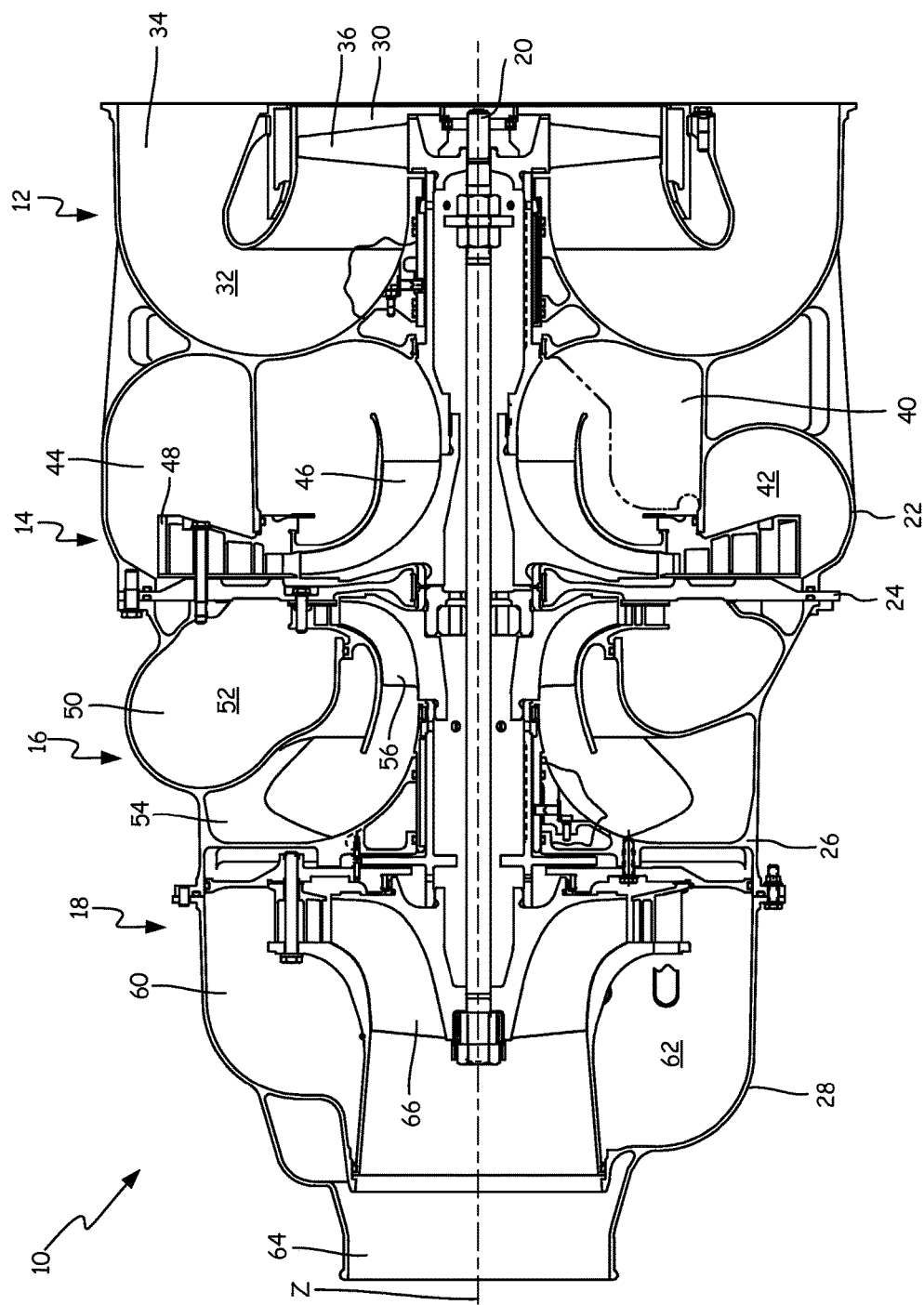
FIG. 1 is a cross-sectional view of an air cycle machine.

FIG. 1 is a cross-sectional view of air cycle machine 10, which includes fan section 12, compressor section 14, first stage turbine section 16, second stage turbine section 18, tie rod 20, fan and compressor housing 22, seal plate 24, first stage turbine housing 26, and second stage turbine housing 28. Also shown in FIG. 1 is axis Z.

Fan section 12, compressor section 14, first stage turbine section 16, and second stage turbine section 18 are all mounted on tie rod 20. Tie rod 20 rotates about axis Z. Fan and compressor housing 22 is connected to seal plate 24 and first stage turbine housing 26 with fasteners. Seal plate 24 separates flow paths in fan and compressor housing 22 from flow paths in first stage turbine housing 26. First stage turbine housing 26 is connected to second stage turbine housing 28 with fasteners. Fan and compressor housing 22, first stage turbine housing 26, and second stage turbine housing 28 together form an overall housing for air cycle machine 10. Fan and compressor housing 22 houses fan section 12 and compressor section 14, first stage turbine housing 26 housing first stage turbine section 16, and second stage turbine housing 28 houses second stage turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan inlet 30 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor nozzle 46, and diffuser 48. Air is routed into compressor inlet 40 and is ducted through compressor duct 42 to compressor outlet 44. Compressor nozzle 46 and diffuser 48 are positioned in compressor duct 42. Compressor nozzle 46 is mounted to and rotates with tie rod 20 to compress the air flowing through compressor duct 42. Diffuser 48 is a static structure through which the compressor air can flow after it has been compressed with compressor nozzle 46. Air exiting diffuser 48 can then exit compressor duct 42 through compressor outlet 44.

First stage turbine section 16 includes first stage turbine inlet 50, first stage turbine duct 52, first stage turbine outlet 54, and first stage turbine nozzle 56. Air is routed into first stage turbine inlet 50 and is ducted through first stage turbine duct 52 to first stage turbine outlet 54. First stage turbine nozzle 56 is positioned in first stage turbine duct 52 and is mounted to and rotates with tie rod 20. First stage turbine nozzle 56 will extract energy from the air passing through first stage turbine section 16 to drive rotation of tie rod 20.

Second stage turbine section 18 includes second stage turbine inlet 60, second stage turbine duct 62, second stage turbine outlet 64, and second stage turbine nozzle 66. Air is routed into second stage turbine inlet 60 and is ducted through second stage turbine duct 62 to second stage turbine outlet 64. Second stage turbine nozzle 66 is positioned in second stage turbine duct 62 and is mounted to and rotates with tie rod 20. Second stage turbine nozzle 66 will extract energy from the air passing through second stage turbine section 18 to drive rotation of tie rod 20.

Air is pulled into air cycle machine 10 with fan section 12. The air that is pulled into air cycle machine 10 can be ambient air, air from a RAM air source, or bleed air from a gas turbine engine. This air can contain particulate matter, such as water droplets, dust, or other fine particles. The air is compressed in compressor section 14 by flowing through compressor nozzle 46. The air then expands as it flows through first stage turbine nozzle 56 in first stage turbine section 16 and second stage turbine nozzle 66 in second stage turbine section 18. To drive the air, compressor nozzle 46, first stage turbine nozzle 56, and second stage turbine nozzle 66 rotate with tie rod 20. As compressor nozzle 46, first stage turbine nozzle 56, and second stage turbine nozzle 66 rotate, particulate matter in the air in air cycle machine 10 can cause erosion of compressor nozzle 46, first stage turbine nozzle 56, and second stage turbine nozzle 66. A coating is thus applied to compressor nozzle 46, first stage turbine nozzle 56, and second stage turbine nozzle 66 to prevent erosion.

Figure 2:
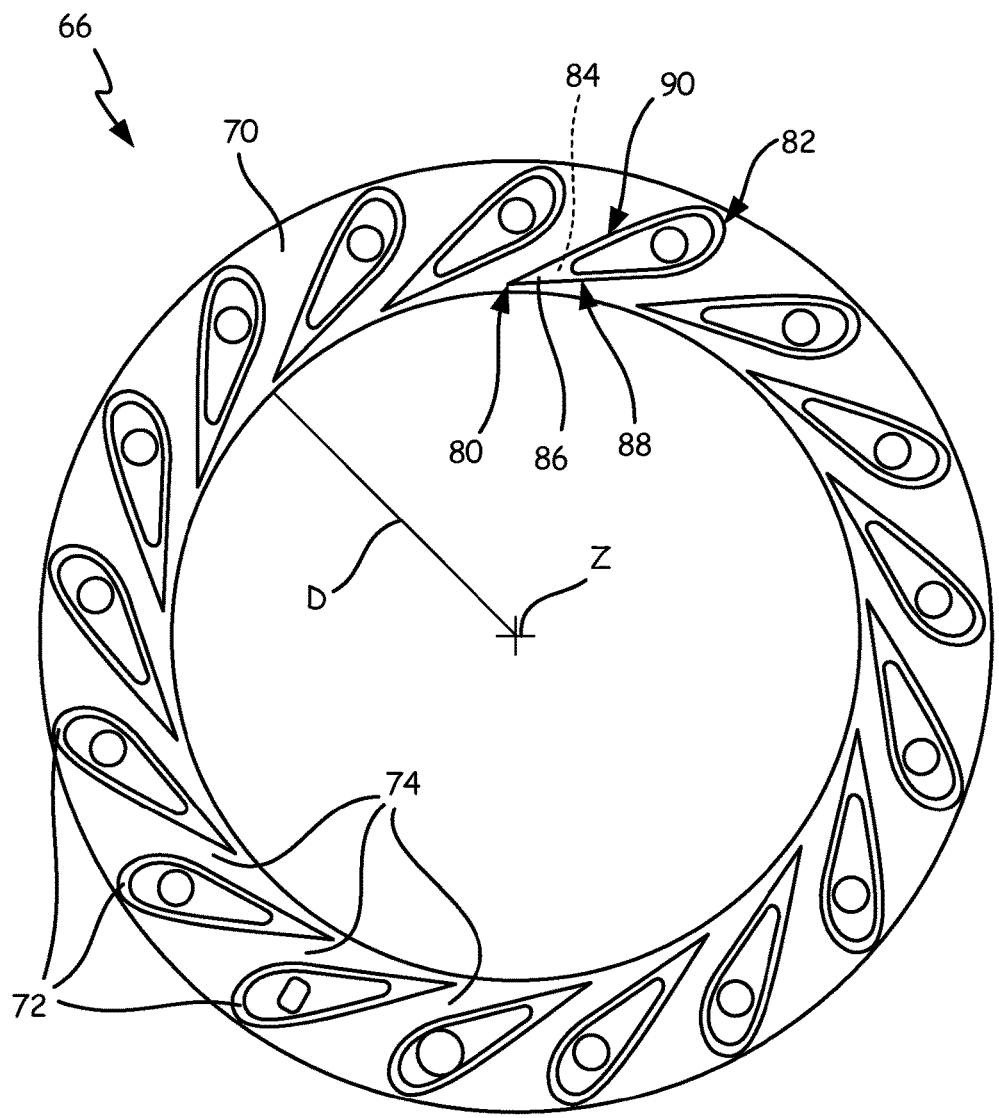
FIG. 2 is a front plan view of a second stage turbine nozzle.
Figure 3:
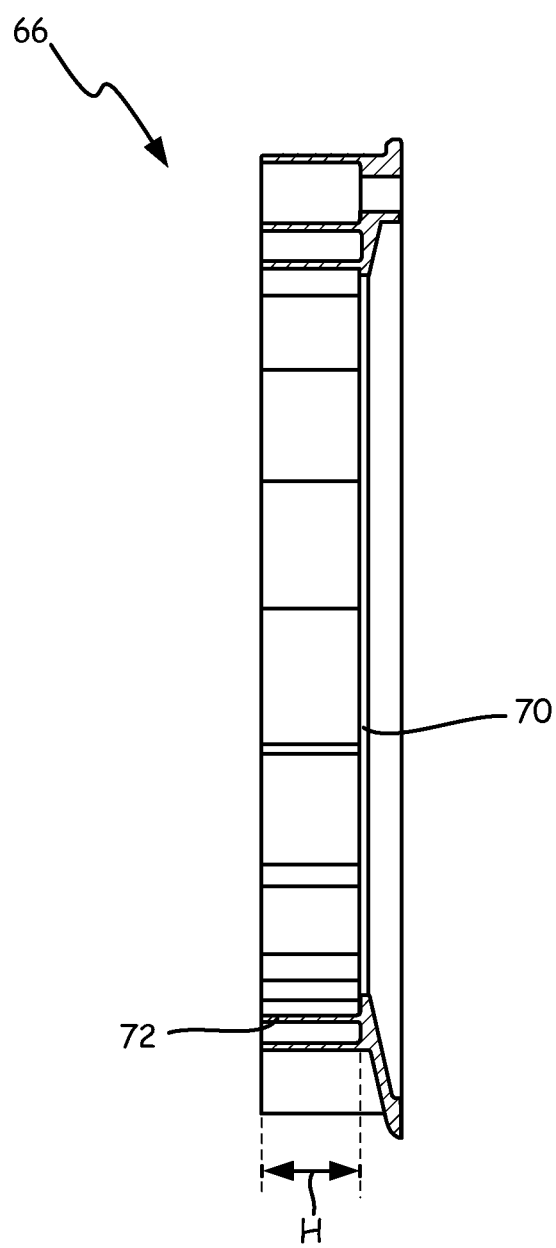
FIG. 3 is a side elevation view of the second stage turbine nozzle.
Figure 4:
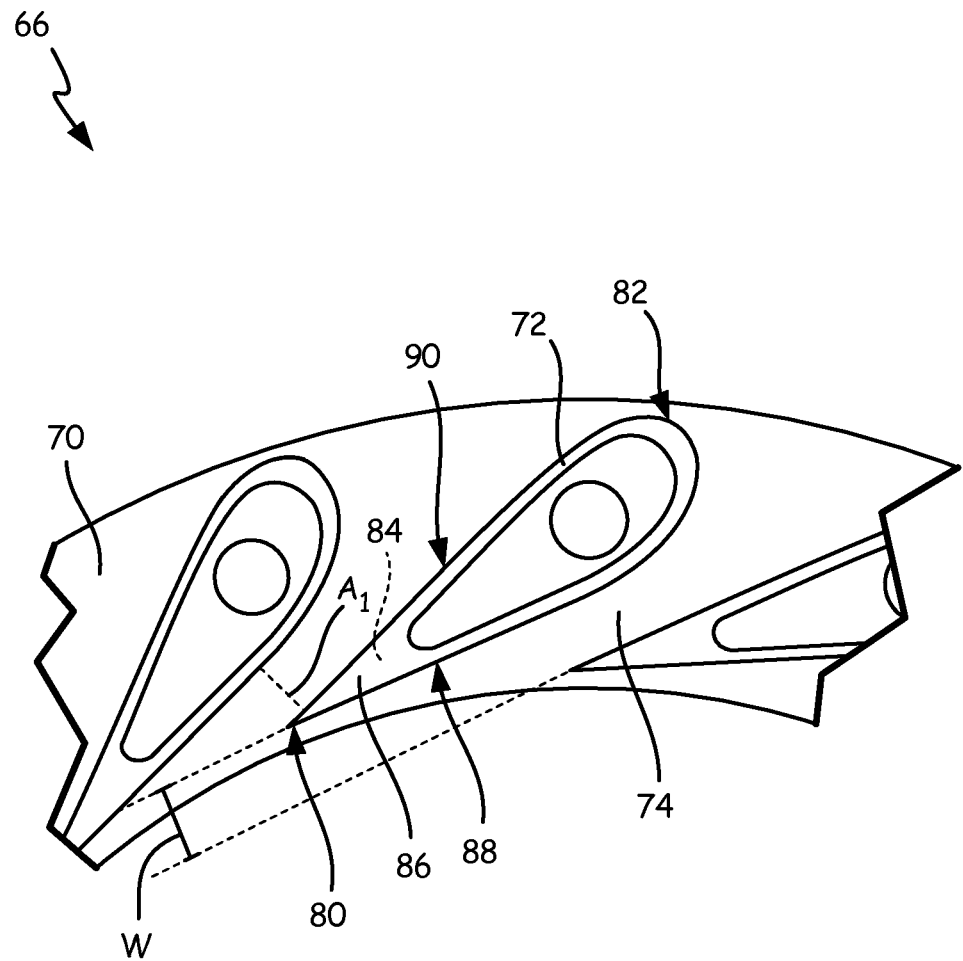
FIG. 4 is a break-away front plan view of the second stage turbine nozzle.

FIG. 2 is a front plan view of second stage turbine nozzle 66. FIG. 3 is a side elevation view of second stage turbine nozzle 66. FIG. 4 is a break-away front plan view of second stage turbine nozzle 66. Second stage turbine nozzle 66 includes second stage disk portion 70, plurality of second stage vanes 72, and plurality of second stage throats 74. Each second stage vane 72 includes first end 80, second end 82, first face 84, second face 86, first sidewall 88, and second sidewall 90. Second stage turbine nozzle 66 also includes central axis Z.

Second stage turbine nozzle 66 is made out of a durable material, such as steel, aluminum, or titanium. A coating, such as tungsten carbide, is also applied to second stage turbine nozzle 66 to protect second stage turbine nozzle 66 from erosion. Second stage turbine nozzle 66 includes disk portion 70, plurality of vanes 72, and plurality of throats 74. Plurality of vanes 72 includes seventeen vanes.

Disk portion 70 is a disk shaped part of second stage turbine nozzle 66 that extends radially outward from central axis Z. Disk portion 70 includes a first face and a second face. Plurality of vanes 72 are positioned on the first face of disk portion 70 and are positioned radially around central axis Z of second stage turbine nozzle 66. Each vane 72 extends a vane height H away from the first face of disk portion 70. Vane height H is between 1.0800 inches (2.7432 centimeters) and 1.1400 inches (2.8956 centimeters). Plurality of throats 74 are defined between radially adjacent vanes 72. Each throat has a throat width W between radially adjacent vanes 72. Throat width W is between 0.3000 inches (0.7620 centimeters) and 0.3320 inches (0.8433 centimeters). Second stage turbine nozzle 66 also includes a flow area A, which is the region through which the working fluid can flow. Flow area A is defined as the sum of flow areas $A_1$ in each throat 74 (flow area $A_1$ as shown in FIG. 4). Flow area $A_1$ is defined by vane height H and throat width W. Flow area A is between 5.5080 inches squared (35.5354 centimeters squared) and 6.4342 inches squared (41.5106 centimeters squared).

Each vane 72 includes first end 80 and second end 82. First end 80 is positioned radially inward and second end 82 is positioned radially outward. First ends 80 of plurality of vanes 72 are positioned diameter D away from center axis Z of second stage turbine nozzle 66. Diameter D is between 8.0640 inches (20.4826 centimeters) and 8.1440 inches (20.6858 centimeters). Each vane 72 also includes first face 84 and second face 86. First face 84 is adjacent to disk portion 70 and second face 86 is axially away from disk portion 70. Each vane 72 further includes first sidewall 88 and second sidewall 90. Both first sidewall 88 and second sidewall 90 extend from first end 80 to second end 82 of each vane 72. First sidewall 88 on one vane 72 faces second sidewall 90 on an adjacent vane 72.

Table 1 below is a list of different ratios of dimensions, including vane height H, throat width W, and diameter D.

TABLE 1

Ratios of dimensions

| Dimensions | Minimum Ratio | Maximum Ratio |
| --- | --- | --- |
| Vane height H to throat width W | 3.2530 | 3.8000 |
| Throat width W to diameter D | 0.0368 | 0.0412 |
| Vane height H to diameter D | 0.1326 | 0.1414 |

Second stage turbine nozzle 66 is manufactured using a casting process. After the casting process, second stage turbine nozzle 66 can have a surface roughness up to 200. In prior art processes, all surfaces of second stage turbine nozzle 66 had to undergo post-processing, such as machining or sand blasting, prior to applying a coating to second stage turbine nozzle 66 so that the surface roughness of second stage turbine nozzle 66 was less than 125.

Using a HVOF spraying technique to apply the coating to second stage turbine nozzle 66 allows the coating to be applied directly to parts of the cast second stage turbine nozzle 66 without post-processing. Specifically, none of first sidewalls 88 of plurality of vanes 72 need to be post-processed when a HVOF spraying process is used to apply the coating to first sidewalls 88 of plurality of vanes 72. This allows the coating to be applied when the surface roughness of first sidewalls 88 of plurality of vanes 72 is between 125 and 200. Using a HVOF spraying process allows for increased hardness in the coating and it allows for a higher percentage of tungsten carbide in the coating as opposed to other materials, such as cobalt. A HVOF spraying process also allows for greater consistency in thickness of the coating as compared to other thermal spraying techniques.

Second stage turbine nozzle 66 is a high value component that is frequently replaced due to damage of second stage turbine nozzle 66. With prior manufacturing processes, every surface of second stage turbine nozzle 66 that was to be coated had to be post-processed prior to the coating being applied. Post-processing every surface of second stage turbine nozzle 66 that is to be coated is a costly and time consuming process. Specifically, plurality of throats 74 are small spaces that makes it difficult to access first sidewalls 88 of plurality of vanes 72 to machine or sand blast these surfaces. Using a HVOF spraying process to apply the coating eliminates this costly and time consuming process, as first sidewalls 88 of plurality of vanes 72 of second stage turbine nozzle 66 do not have to be post-processed prior to applying the coating. This simplifies the manufacturing process and makes second stage turbine nozzle 66 more producible and less costly and time consuming to manufacture.

Discussion of Possible Embodiments

The following are non-exclusive descriptions of possible embodiments of the present invention.

A second stage turbine nozzle includes a second stage disk portion having a central axis and a plurality of second stage vanes positioned radially around and attached to the second stage disk portion. Each second stage vane extends a vane height H away from the second stage disk portion, and each second stage vane has a first end positioned at a diameter D away from the central axis. The second stage turbine nozzle also includes a plurality of second stage throats defined between radially adjacent second stage vanes, wherein each second stage throat has a throat width W between radially adjacent second stage vanes. The second stage turbine nozzle also includes a coating on a sidewall of each second stage vane, wherein a surface roughness of the sidewall is between 125 and 200.

The second stage turbine nozzle of the preceding paragraph can optionally include, additionally and/or alternatively, any one or more of the following features, configurations and/or additional components:

A further embodiment of the second stage turbine nozzle, wherein the coating is a tungsten carbide coating.

A further embodiment of any of the foregoing second stage turbine nozzles, wherein the plurality of second stage vanes includes 17 vanes.

A further embodiment of any of the foregoing second stage turbine nozzles, wherein a ratio of the vane height H to the throat width W is between 3.2530 and 3.8000.

A further embodiment of any of the foregoing second stage turbine nozzles, wherein a ratio of the throat width W to the diameter D is between 0.0368 and 0.0412.

A further embodiment of any of the foregoing second stage turbine nozzles, wherein a ratio of the vane height H to the diameter D is between 0.1326 and 0.1414.

A further embodiment of any of the foregoing second stage turbine nozzles, wherein the diameter D is between 8.0640 inches (20.4826 centimeters) and 8.1440 inches (20.6858 centimeters); the vane height H is between 1.0800 inches (2.7432 centimeters) and 1.1400 inches (2.8956 centimeters); and the throat width W is between 0.3000 inches (0.7620 centimeters) and 0.3320 inches (0.8433 centimeters).

A further embodiment of any of the foregoing second stage turbine nozzles, wherein a flow area A is defined by a sum of the flow area in each second stage throat in the second stage turbine nozzle.

A further embodiment of any of the foregoing second stage turbine nozzles, wherein the flow area A is between 5.5080 inches squared (35.5354 centimeters squared) and 6.4342 inches squared (41.5106 centimeters squared).

An air cycle machine includes a fan section with a fan rotor; a compressor section with a compressor nozzle; a first stage turbine section with a first stage turbine nozzle; and a second stage turbine section with any of the foregoing second stage turbine nozzles.

A method of coating a second stage turbine nozzle includes casting a second stage turbine nozzle with a second stage disk portion and a plurality of second stage vanes, and applying an erosion coating to a cast sidewall of each of the plurality of second stage vanes.

The method of the preceding paragraph can optionally include, additionally and/or alternatively, any one or more of the following features, configurations and/or additional components:

A further embodiment of the method, where in the plurality of second stage vanes includes 17 vanes.

A further embodiment of any of the foregoing methods, wherein the cast sidewall of each of the plurality of second stage vanes has a surface roughness between 125 and 200.

A further embodiment of any of the foregoing methods, wherein applying an erosion coating to the cast sidewall is done using a high velocity oxygen fuel spraying process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of coating a second stage turbine nozzle comprising:
    casting a second stage turbine nozzle with a second stage disk portion and a plurality of second stage vanes; and
    applying a tungsten carbide erosion coating directly to a cast surface of a sidewall of each of the plurality of second stage vanes using a high velocity oxygen fuel spraying process, wherein the cast surface has not undergone post-processing to reduce a surface roughness.

2. The method of claim 1, where in the plurality of second stage vanes includes 17 vanes.

* * * * *